(12) United States Patent
Uchida et al.

(10) Patent No.: US 8,749,693 B2
(45) Date of Patent: Jun. 10, 2014

(54) LIGHT REDUCTION DEVICE AND IMAGING APPARATUS

(75) Inventors: Shinji Uchida, Osaka (JP); Yoshiaki Sugitani, Nara (JP)

(73) Assignee: Panasonic Corporation, Osaka (JP)

(\*) Notice: Subject to any disclaimer, the term of this patent is extended or adjusted under 35 U.S.C. 154(b) by 116 days.

(21) Appl. No.: 13/582,596

(22) PCT Filed: Jul. 6, 2011

(86) PCT No.: PCT/JP2011/003859
§ 371 (c)(1),
(2), (4) Date: Sep. 4, 2012

(87) PCT Pub. No.: WO2012/004989
PCT Pub. Date: Jan. 12, 2012

(65) Prior Publication Data
US 2013/0002930 A1   Jan. 3, 2013

(30) Foreign Application Priority Data
Jul. 9, 2010 (JP) .................................. 2010-156942

(51) Int. Cl.
H04N 5/225 (2006.01)
H04N 9/64 (2006.01)
G03B 9/32 (2006.01)
G03B 9/04 (2006.01)

(52) U.S. Cl.
USPC ........... 348/340; 348/342; 348/335; 348/248; 396/480; 396/459; 396/481; 396/209

(58) Field of Classification Search
CPC ......... H04N 5/225; H04N 5/262; H04N 9/64; H04N 9/32; H04N 9/34; H04N 9/04; H04N 7/24; H04N 7/00; H04N 5/22
USPC .......... 348/335, 340, 342, 239, 248; 396/480, 396/481, 459, 209, 237; 359/885, 888, 889, 359/890, 891, 894, 484.09
See application file for complete search history.

(56) References Cited

U.S. PATENT DOCUMENTS 7,800,686 B2 * 9/2010 Meguro et al. ................. 348/361
2008/0024654 A1 * 1/2008 Shinohara ...................... 348/362

FOREIGN PATENT DOCUMENTS

| EP | 0 566 383 | 10/1993 |
|----|-----------|---------|
| JP | 3-52725   | 5/1991  |

(Continued)

OTHER PUBLICATIONS

International Search Report issued Aug. 2, 2011 in corresponding International Application No. PCT/JP2011/003859.

(Continued)

*Primary Examiner* — Lin Ye
*Assistant Examiner* — Marly Camargo
(74) *Attorney, Agent, or Firm* — Wenderoth, Lind & Ponack, L.L.P.

(57) ABSTRACT

A light reduction device for adjusting an amount of light reaching an imaging device includes: a light shielding plate in which light shielding parts are discretely formed for blocking the light, and a light transmission part is formed for transmitting the light; a first light reduction plate in which light reduction parts are discretely formed for reducing the amount of the light passing through, and a light transmission part is formed for transmitting the light; and a moving unit configured to move at least one of the light shielding plate and the first light reduction plate in a first direction which intersects with an incident direction of the light, in which the light shielding plate and the first light reduction plate overlap each other at least in part, when viewed from the incident direction of the light.

10 Claims, 5 Drawing Sheets

(56) References Cited

FOREIGN PATENT DOCUMENTS

| | | |
|---|---|---|
| JP | 6-289458 | 10/1994 |
| JP | 3034784 | 3/1997 |
| JP | 2000-122109 | 4/2000 |
| JP | 2004-151356 | 5/2004 |
| JP | 2005-13877 | 1/2005 |
| JP | 2010-4450 | 1/2010 |
| JP | 2010-102044 | 5/2010 |

OTHER PUBLICATIONS

Reply to the Written Opinion issued Aug. 2, 2011 in corresponding International Application No. PCT/JP2011/003859 (with English translation).

* cited by examiner

LIGHT REDUCTION DEVICE AND IMAGING APPARATUS

TECHNICAL FIELD

The present invention relates to a light reduction device for adjusting an amount of light reaching an imaging device, and an imaging apparatus provided with the light reduction device.

BACKGROUND ART

A conventional light reduction device reduces light, for example, by blocking a light path using diaphragm blades or by absorbing or reflecting the light using a neutral density filter (hereinafter, referred to as "ND filter").

For example, Patent Literature 1 discloses a light reduction device for adjusting reduction of the light by applying a current to a driving coil to control an aperture of the diaphragm blades, which are biased to be closed, to open against the biasing force.

According to the light reduction device disclosed in Patent Literature 1, a lower diaphragm blade and an upper diaphragm blade which overlap each other are shifted in parallel with each other by force generated by an actuator so as to vary an aperture formed between the blades, thereby blocking a light beam and reducing the light.

A center of the aperture is defined to be coincident with a center of an optical axis of a lens, so that a distance between the two blades is controlled to adjust an amount of the reduced light optimally.

As is also disclosed in Patent Literature 2, another light reduction device has been proposed which uses the diaphragm blade and the ND filter.

According to the light reduction device disclosed in Patent Literature 2, the diaphragm blade is shifted on a plane orthogonal to the optical axis to allow an aperture to be variable, and the ND filter is shifted on the plane orthogonal to the optical axis to cause an amount of transmissive light to be variable. The light-reduction adjustment is thus performed.

The ND filter is previously placed at an area out of an aperture area, and the light reduction device disclosed in Patent Literature 2 shifts the ND filter which has an optimal light-reduction level to cover the aperture area.

Similar to in the light reduction device disclosed in the Patent Literature 1, in the light reduction device disclosed in Patent Literature 2, the center of the aperture is also placed to be coincident with the center of the optical axis of the lens, and the diaphragm blade and the ND filter are placed over the aperture to adjust and reduce the light.

Patent Literature 3 proposes a light reduction device which employs a turret diaphragm plate made of a super thin plate having a sheet shape.

The light reduction device disclosed in Patent Literature 3 includes a curved oscillation plate perforated by a plurality of apertures having mutually different aperture diameters, and selects a proper aperture by repeatedly oscillating the curved oscillation plate laterally at a certain angle.

With this configuration, according to the light reduction device disclosed in Patent Literature 3, the aperture can be easily placed on the optical axis, so that the light amount can be reduced according to a size of the aperture.

CITATION LIST

Patent Literature

[PTL 1] Japanese unexamined patent application publication No. 2004-151356

[PTL 2] Japanese unexamined patent application publication No. 2000-122109

[PTL 3] Japanese utility model application publication No. 3-52725

SUMMARY OF INVENTION

Technical Problem

In relation to the conventional light reduction devices which employ the aforementioned diaphragm, however, a problem is raised that a degree of blur is varied when the light is reduced.

Here, the blur in the image captured by a camera is defined as, not the quality of an in-focus image with high resolution, but the quality of an out-of-focus image with low resolution. Recently, a depth from defocus (DFD) technique, or the like, has been employed to estimate a distance or depth using the blur degree of a captured image.

In the DFD technique, if an image quality of a just-focused image is used as a standard, correlativity of a distance with the blur degree based on the image quality is used to estimate the distance. Accordingly, if the blur degree is varied as a result of the light reduction conducted in conformity with the capturing condition, the distance cannot be accurately estimated.

The blur degree generally depends on an F-number of an optical system, i.e., a value obtained by dividing a focal length of a lens by an effective diameter of the aperture. Accordingly, it is known that the smaller the F-number is, the larger the blur degree becomes, and as the F-number increases, it becomes difficult for the blur to occur.

In the technique disclosed in Patent Literature 1, two diaphragm blades are shifted so as to change the distance between them, to thereby reduce the light. Accordingly, as a degree of the light reduction increases, the light is gradually blocked from a peripheral area. As a result, the effective diameter of the aperture is varied.

Specifically, when the aperture has the maximum diameter, the F-number becomes smallest and the blur degree becomes great. However, as the aperture is narrowed, the effective diameter of the aperture decreases, causing the F-number to increase and the blur to be difficult to occur.

Therefore, if the diaphragm is used to adjust the light amount when an exposure amount increases in response to the change in brightness, the blur degree is varied to significantly deteriorate accuracy of the distance estimation.

Similarly, in the light reduction device disclosed in Patent Literature 3, the oscillation plate having the apertures is repeatedly oscillated laterally at the certain angle to select the proper aperture. Accordingly, the effective diameter of the aperture is varied by the selected aperture, to thereby cause the blur degree to be varied.

In the light reduction device disclosed in Patent Literature 2, two diaphragm blades are so placed as to have the optical axis at the center between them, and the aperture area is changed to control the light-reduction amount. Accordingly, an effective diameter in an area through which the light passes varies, thereby causing the blur degree to be varied even under a capturing condition where a focal length or a subject distance is not changed.

In order to reduce the light using the ND filter, the ND filter needs to be moved on the optical axis. To be specific, in order to change a state in which the ND filter does not cover the aperture area at all to a state in which the ND filter covers the overall aperture area, the ND filter needs to be moved significantly. Therefore, the light reduction device disclosed in Patent Literature 2 requires placing the ND filter in a space out of the aperture area, and also requires a space for the movement of the ND filter. Accordingly, it has been difficult for the device to be miniaturized.

This imposes a significantly major problem for equipment which is strongly urged to be miniaturized, such as a digital still camera, a digital video camera, and so on.

In view of the above, an object of the present invention is to provide a light reduction device which solves the above problem, and an imaging apparatus provided with the light reduction device. To be specific, the aimed light reduction device can suppress the variation of the blur degree when the amount of the light reaching the imaging device is adjusted, and can be miniaturized.

Solution to Problem

In order to achieve the above object, a light reduction device according to an aspect of the present invention is used for adjusting an amount of light reaching an imaging device, and the light reduction device includes: a light shielding plate in which a plurality of light shielding parts are discretely formed for blocking the light, and a first light transmission part is formed for transmitting the light; a first light reduction plate in which a plurality of first light reduction parts are discretely formed for reducing the amount of the light passing through, and a second light transmission part is formed for transmitting the light; and a moving unit configured to move at least one of the light shielding plate and the first light reduction plate in a first direction which intersects with an incident direction of the light, in which the respective light shielding plate and the first light reduction plate overlap each other at least in part, when viewed from the incident direction of the light.

With this configuration, the light shielding parts are discretely formed in the light shielding plate, and the first light reduction parts are discretely formed in the first light reduction plate. Accordingly, at least one of the light shielding plate and the first light reduction plate is moved in the direction which intersects with the incident direction of the light, thereby changing an overlap pattern between the light shielding parts and the first light reduction parts. As a result, a light transmission-ratio can be changed. In other words, the light reduction plate is not required to significantly move for changing the light transmission-ratio, so that miniaturization of the device can be achieved. Furthermore, an area of the first light transmission part, i.e., an aperture area, formed in the light shielding plate is not changed, to thereby suppress a variation in a blur degree.

It is desirable that an arrangement pattern of the light shielding parts in the light shielding plate and an arrangement pattern of the first light reduction parts in the first light reduction plate are identical; and each of the light shielding parts and each of the first light reduction parts is identical in shape and size.

With this configuration, the arrangement pattern for the light shielding parts and that for the first light reduction parts are identical to each other. To be specific, each one of the light shielding parts and the corresponding one of the first light reduction parts can overlap overall, so that a state where the light is not reduced by the first light reduction parts can be created. Accordingly, a relatively large amount of the light can reach the imaging device, in addition to the achievement of the suppression of the variation in the blur degree and the miniaturization of the device.

It is desirable that the light shielding parts and the first light transmission part are alternately arranged in the first direction in the light shielding plate; and the first light reduction parts and the second light transmission part are alternately arranged in the first direction in the first light reduction plate.

With this configuration, at least one of the light shielding plate and the first light reduction plate is moved by a distance between one of the first light reduction parts and the second light transmission part which are next to each other in the first direction, thereby changing states between a state where each of the light shielding parts and a corresponding one of the first light reduction parts overlap and a state where the first light transmission part and at least one of the first light reduction parts overlap. In other words, the high transmission-ratio state and the low transmission-ratio state can be changed with a relatively small movement amount of the plates, so that miniaturization of the device can be achieved.

It is desirable that a plurality of first light transmission parts including the first light transmission part are formed in the light shielding plate; a plurality of second light transmission parts including the second light transmission part are formed in the first light reduction plate; the light shielding parts and the first light transmission parts are arranged in a checkerboard design in the light shielding plate; and the first light reduction parts and the second light transmission parts are arranged in the checkerboard design in the first light reduction plate.

With this configuration, an aperture ratio of 50% can be achieved. In addition, the light shielding plate and the first light reduction plate can be arranged in such a manner that either the light shielding parts or the first light transmission parts cover the first light reduction parts, when viewed from the incident direction of the light. Specifically, a relatively large amount of the light can reach the imaging device, in addition to the achievement of the suppression of the variation in the blur degree and the miniaturization of the device.

It is desirable that the moving unit is configured to move at least one of the light shielding plate and the first light reduction plate in the first direction so that the light shielding plate and the first light reduction plate relatively move by a distance, in the first direction, between a center of one of the first light reduction parts and a center of the second light transmission part which are next to each other in the first direction.

With this configuration, at least one of the light shielding plate and the first light reduction plate is moved for a distance between a center of one of the first light reduction parts and a center of the second light transmission part which are next to each other in the first direction, thereby changing the states between the state where each of the light shielding parts and a corresponding one of the first light reduction parts overlap and the state where the first light transmission part and each of the first light reduction parts overlap. In other words, the high transmission-ratio state and the low transmission-ratio state can be changed with a much smaller movement amount, so that the miniaturization of the device can be achieved.

It is desirable that the moving unit is configured to move at least one of the light shielding plate and the first light reduction plate so that a state in which each of the first light reduction parts and a corresponding one of the light shielding parts overlap is changed to a state in which each of the first light reduction parts and the first light transmission part overlap, when viewed from the incident direction of the light.

With this configuration, the high-transmission ratio state where the first light transmission part and the second light transmission part overlap can be changed to the low-transmission ratio state where the first light transmission part and at least one of the first light reduction parts overlap.

It is desirable that the light reduction device further includes a second light reduction plate in which a plurality of second light reduction parts are discretely formed for reducing the amount of the light passing through, and a third light transmission part is formed for transmitting the light, in which the light shielding plate and the second light reduction plate overlap each other at least in part, when viewed from the incident direction of the light; and the moving unit is configured to move the first light reduction plate in the first direction, and the second light reduction plate in a second direction which intersects with the incident direction of the light.

With this configuration, both the first light reduction plate and the second light reduction plate can be used, so that a variety of transmission ratio can be achieved. As a result, the light transmission ratio can be effectively changed.

It is desirable that the first direction and the second direction are orthogonal to each other.

With this configuration, the first light reduction plate and the second light reduction plate are moved in the respective directions which are orthogonal to each other. Accordingly, the moving unit can be easily placed, so that the miniaturization of the device can be achieved.

It is desirable that a transmission ratio of the first light reduction parts and a transmission ratio of the second light reduction parts are different from each other.

With this configuration, four transmission ratios can be achieved in the following cases: (1) the light is not reduced by the first light reduction parts and the second light reduction parts; (2) the light is reduced by the first light reduction parts; (3) the light is reduced by the second light reduction parts; and (4) the light is reduced by both of the first and second light reduction parts. Accordingly, the light transmission-ratio can be effectively changed.

An imaging apparatus according to an aspect of the present invention includes the aforementioned light reduction device.

Advantageous Effects of Invention

According to the present invention, an area of the first light transmission part, i.e., an aperture area, formed in the light shielding plate is not changed upon controlling the amount of the light reaching the imaging device, thereby suppressing the variation in the blur degree. Furthermore, an overlap pattern between the light shielding parts and the first light reduction parts is merely changed for varying the light transmission-ratio. Accordingly, the light reduction plate is not required to significantly move, thereby achieving the miniaturization of the device.

DESCRIPTION OF EMBODIMENTS

Hereinafter, an embodiment of the present invention is described with reference to drawings.

Embodiment

Figure 1:
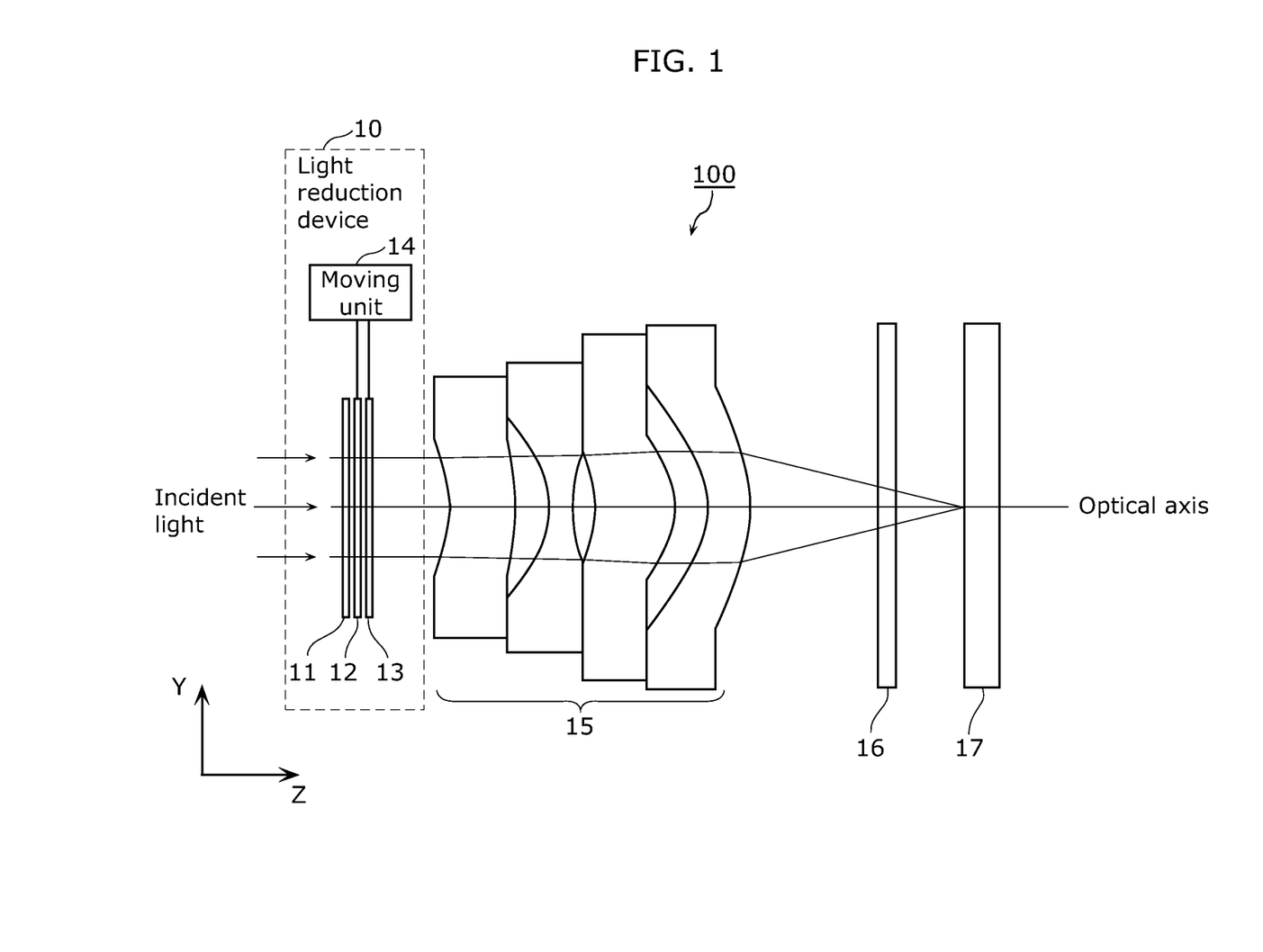
FIG. 1 is a diagram which shows a configuration of an imaging apparatus according to an embodiment of the present invention.

FIG. 1 is a diagram which shows a configuration of an imaging apparatus according to an embodiment of the present invention. In the following diagrams, an X-direction, Y-direction, and Z-direction are perpendicular to one another. Here, the Z-direction is a direction in parallel to an optical axis. In the present embodiment, the X-direction corresponds to a first direction, and the Y-direction corresponds to a second direction. In addition, the Z-direction corresponds to an incident direction of light.

An imaging apparatus 100 is, for example, a digital still camera, a digital video camera, and captures a subject. As shown in FIG. 1, the imaging apparatus 100 includes a light reduction device 10, an optical lens system 15, a cover glass 16, and an imaging device 17.

The light reduction device 10 is used for adjusting an amount of light reaching the imaging device 17. The light reduction device 10 includes a light shielding plate 11, a first light reduction plate 12, a second light reduction plate 13, and a moving unit 14.

The light shielding plate 11, the first light reduction plate 12, and the second light reduction plate 13 are described later in detail with reference to FIGS. 2 to 5.

The moving unit 14 moves the first light reduction plate 12 and the second light reduction plate 13 in a direction which intersects with the incident direction of the light. More preferably, the moving unit 14 moves the first light reduction plate 12 and the second light reduction plate 13 in a direction which is orthogonal to the incident direction of the light.

Specifically, the moving unit 14 includes, for example, a voice coil motor (VCM) or a piezo-actuator.

The VCM is a driving device which moves a board using force generated by applying a current to a coil in a magnetic field, and is used with magnets or coils being arranged to surround the board.

The piezo-actuator is a driving device to move the board using displacement occurring due to application of a voltage to a piezo element, and can be placed in a relatively unlimited position regardless of a size of the board.

Particularly, when a movement distance is relatively short like the present embodiment, the piezo-element is effective, as the moving unit, which is, in comparison with the VCM, smaller and capable of performing higher accuracy driving at higher speed, and is also superior in terms of low power consumption.

The optical lens system 15 includes a plurality of lenses, and forms an image on an imaging surface from light which has passed through the light shielding plate 11, the first light reduction plate 12, and the second light reduction plate 13. Although the optical lens system 15 includes a plurality of the lenses in the present embodiment, the optical lens system 15 may include a single lens. The light shielding plate 11, the first light reduction plate 12, and the second light reduction plate 13 may be arranged in the middle of the lenses included in the optical lens system 15.

The cover glass 16 is a member for protecting an imaging surface of the imaging device 17, and covers the imaging surface of the imaging device 17. It should be noted that the cover glass 16 is not necessarily placed. In other words, the imaging apparatus 100 may include the cover glass 16 according to the needs of design.

The imaging device 17 is a solid-state image device, such as a charge coupled device (CCD) image sensor or a complementary metal oxide semiconductor (CMOS) image sensor. The imaging device 17 converts, to an electric signal, the light reaching the imaging surface via the light reduction device 10, the optical lens system 15, and the cover glass 16.

Next, the light shielding plate 11, the first light reduction plate 12, and the second light reduction plate 13 provided in the light reduction device 10 are described in detail with reference to FIGS. 2 to 5.

Figure 2:
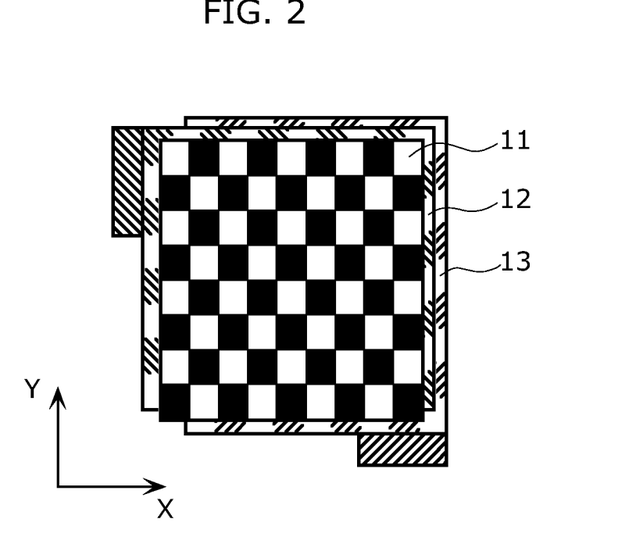
FIG. 2 is a diagram which shows a configuration of a light reduction device according to the embodiment of the present invention.

FIG. 2 is a diagram which shows a configuration of the light reduction device according to the embodiment of the present invention. Specifically, FIG. 2 is a plan view showing the light reduction device 10 viewed from a side which the light reaches. It should be noted that the moving unit 14 is not shown in FIG. 2.

As shown in FIG. 2, the light shielding plate 11, the first light reduction plate 12, and the second light reduction plate 13 are arranged in such a manner that of the respective plates overlap one another at least in part, when viewed from the incident direction of the light. Specifically, the light shielding plate 11, the first light reduction plate 12, and the second light reduction plate 13 are arranged to overlap one another so as to cover an overall area which the light reaches. In addition, the light shielding plate 11, the first light reduction plate 12, and the second light reduction plate 13 are arranged to be precisely positioned at respective predetermined positions.

Although FIG. 2 shows that the light shielding plate 11, the first light reduction plate 12, and the second light reduction plate 13 are arranged in this order from the light-incident side, these plates are not necessarily arranged in this order. For example, the first light reduction plate 12, the second light reduction plate 13, and the light shielding plate 11 may be arranged in this order.

Furthermore, respective spaces between two of the light shielding plate 11, the first light reduction plate 12, and the second light reduction plate 13 are preferably small and uniform as much as possible.

Figure 3:
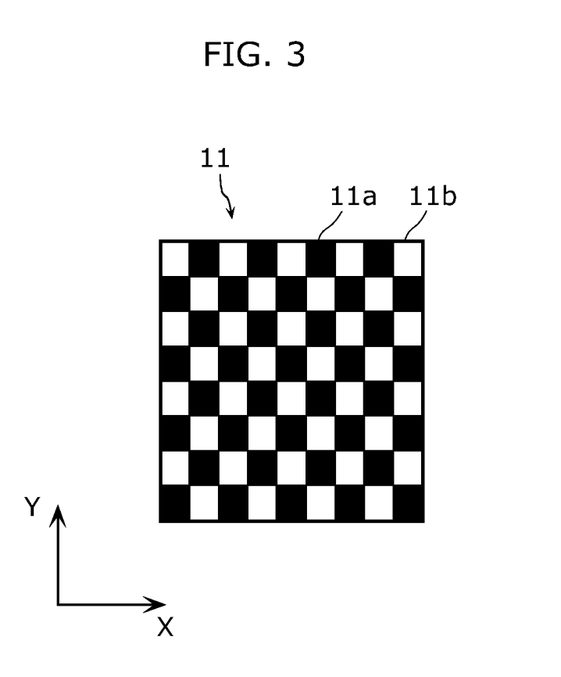
FIG. 3 is a diagram which shows a configuration of a light shielding plate according to the embodiment of the present invention.

Next, the light shielding plate 11 is described in detail.

FIG. 3 is a diagram which shows a configuration of the light shielding plate according to the embodiment of the present invention. As shown in FIG. 3, a plurality of light shielding parts 11*a* which block the light are discretely formed in the light shielding plate 11. Meanwhile, in the light shielding plate 11, light transmission parts 11*b* which transmit the light are formed in areas where the light shielding parts 11*a* are not formed. Specifically, the light shielding parts 11*a* and the light transmission parts 11*b* are alternately arranged in an intersection direction which intersects with the incident direction of the light.

More specifically, the light shielding parts 11*a* and the light transmission parts 11*b* are arranged in a checkerboard design. In other words, the light shielding parts 11*a* and the light transmission parts 11*b* are alternately arranged in two directions which are orthogonal to each other. Furthermore, each of the light shielding parts 11*a* and each of the light transmission parts 11*b* have a same size, and are formed in a square shape.

It should be noted that each of the light transmission parts 11*b* corresponds to a first transmission part.

A distance between each of the light shielding parts 11*a* next to each other among the light shielding parts 11*a* arranged in the checkerboard design is 100 µm, for example.

Specifically, a length of a single side of each light transmission part 11*b* is 100 µm, for example. This prevents a strong effect due to diffraction of the light, thereby enabling the light reduction device 10 to obtain optically preferable characteristics. The distance between each of the light shielding parts 11*a* next to each other is not limited to 100 µm, but the distance may be in a size of more than several times to a few dozen times of a used frequency.

It should be noted that the same shape and size means precisely same shape and size, and also means substantially the same shape and size.

Here, a method for manufacturing the light shielding plate 11 is described below.

The light shielding plate 11 is manufactured by discretely forming a plurality of light shielding films on a transparent board, for example. In this case, an area where the light shielding film is formed corresponds to each of the light shielding parts 11*a*, while an area where the light shielding film is not formed corresponds to each of the light transmission parts 11*b*.

As a board material of the light shielding plate 11, an optical glass or a resin film is used, for example. As the optical glass, it is preferable to use a transparent glass material, such as a BK7, FD60, B270, quartz, or the like.

The light shielding film formed on the optical glass is formed using a sputtering technique, an electron beam deposition technique, a spin-coating technology, or the like. As a material of the light shielding film, used is a metallic material including chrome, tungsten, titanium, or the like, or a light-shielding resin material obtained by dispersing a black pigment in resin.

A light shielding film having an appropriate film thickness is manufactured, to thereby form a light shielding film blocking light which is to pass through and having a small amount of reflection light.

A pattern of the light shielding film can be formed by known techniques including a lithography technique, an electron beam drawing technique, a mask deposition technique, or the like.

The manufacturing method of the light shielding plate 11 need not be limited to the above. For example, the light shielding plate 11 may be manufactured by forming a through-hole on a board having the light-shielding effect. In this case, an area where the through-hole is not formed corresponds to each of the light shielding parts 11*a*, while an area where the through-hole is formed corresponds to each of the light transmission parts 11*b*.

Figure 4:
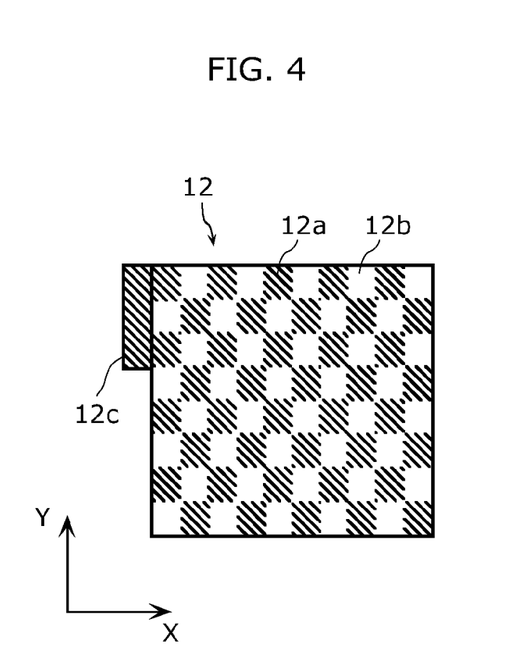
FIG. 4 is a diagram which shows a configuration of a first light reduction plate according to the embodiment of the present invention.
Figure 5:
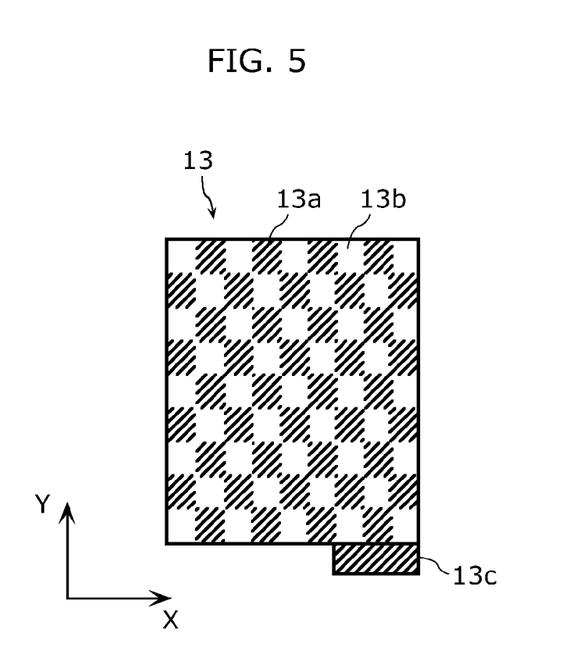
FIG. 5 is a diagram which shows a configuration of a second light reduction plate according to the embodiment of the present invention.

Next, the first light reduction plate 12 and the second light reduction plate 13 are described in detail.

FIG. 4 is a diagram which shows a configuration of the first light reduction plate according to the embodiment of the present invention. Meanwhile, FIG. 5 is a diagram which shows a configuration of the second light reduction plate according to the embodiment of the present invention.

As shown in FIG. 4, in the first light reduction plate 12, a plurality of light reduction parts 12*a* are discretely formed. Meanwhile, in the first light reduction plate 12, light transmission parts 12*b* which transmit the light are formed in areas where the light shielding parts 12*a* are not formed. As shown in FIG. 5, in the second light reduction plate 13, a plurality of light reduction parts 13*a* are discretely formed as in the first light reduction plate 12, and light transmission parts 13*b* which transmit the light are formed on areas where the light reduction parts 13*a* are not formed.

Here, the light reduction parts 12*a* and 13*a* function as an ND filter which reduces an amount of the light passing through. In the present embodiment, transmission ratios of the light reduction parts 12a and the light reduction parts 13a are different from each other. Specifically, for example, the light reduction parts 12a have the transmission ratio of 1/10 (optical density: OD=1), while the light reduction parts 13a have the transmission ratio of 1/100 (optical density: OD=10).

Each of the light reduction parts 12a corresponds to a first light reduction part, while each of the light reduction parts 13a corresponds to a second light reduction part. In addition, each of the light transmission parts 12b correspond to a second transmission part, while each of the light transmission parts 13b corresponds to a third light transmission part.

In the first light reduction plate 12, the light reduction parts 12a and the light transmission parts 12b are alternately arranged in a direction which intersects with the incident direction of the light. In the second light reduction plate 13, the light reduction parts 13a and the light transmission parts 13b are alternately arranged in the direction which intersects with the incident direction of the light.

More specifically, in the first light reduction plate 12, the light reduction parts 12a and the light transmission parts 12b are arranged in the checkerboard design. In other words, the light reduction parts 12a and the light transmission parts 12b are alternately arranged in two directions which are orthogonal to each other. Furthermore, each of the light reduction parts 12a and each of the light transmission parts 12b have the same size and are formed in a square shape.

In addition, in the second light reduction plate 13, the light reduction parts 13a and the light transmission parts 13b are arranged in the checkerboard design in the similar way with the first light reduction plate 12.

Similar to the light shielding plate 11, 100 μm is allocated, for example, to a distance between each of the light reduction parts 12a next to each other among the light reduction parts 12a arranged in the checkerboard design and a distance between each of the light reduction parts 13a next to each other among the light reduction parts 13a arranged in the checkerboard design.

As is obvious from the above description, an arrangement pattern for the light shielding parts 11a in the light shielding plate 11 is identical with that for the light reduction parts 12a in the first light reduction plate 12. Furthermore, the arrangement pattern for the light shielding parts 11a in the light shielding plate 11 is identical with that for the light reduction parts 13a in the second light reduction plate 13. A reason is described later as to why the arrangement pattern for the light shielding parts 11a in the light shielding plate 11 is made to identical with the respective arrangement patterns for the light shielding parts 12a and 13a which are respectively in the first light reduction plate 12 and the second light reduction plate 13.

Meanwhile, in the first light reduction plate 12 and the second light reduction plate 13, a projection unit 12c and a projection unit 13c are respectively provided which are used for physical connection to the moving unit 14. The moving unit 14 causes, via the projection units 12c or 13c, the first light reduction plate 12 or the second light reduction plate 13 to move in the first direction or the second direction both of which intersect with the incident direction of the light.

It should be noted that each of the projection units 12c and 13c is not limited to a rectangular shape as shown in the drawings. Specifically, each of the projection units 12c and 13c may be formed in any shapes as long as they function as a member for physically connecting the first light reduction plate 12 or the second light reduction plate 13 to the moving unit 14 when the first light reduction plate 12 or the second light reduction plate 13 is moved.

A method for manufacturing the first light reduction plate 12 and the second light reduction plate 13 is described below.

The first light reduction plate 12 and the second light reduction plate 13 are manufactured by discretely forming a plurality of the light reduction films on a transparent board, for example. In this case, an area where the light reduction film is formed corresponds to each of the light reduction parts 12a or 13a, while an area where the light reduction film is not formed corresponds to each of the light transmission parts 12b or 13b.

Since the board material for each of the first and second light reduction plates 12 and 13 is same with that for the light reduction plate 11, details for the material are omitted but the optical glass or the resin film is used for the material. Since a space for incorporation is small in a digital still camera or a digital video camera, the board material is preferably the resin film which allows the board itself to be thin.

As the ND filter, generally known are a reflection-type ND filter which reduces the incident light by reflection, and an absorption-type ND filter which reduces the incident light by absorption. If reflected light is generated from the light reduction parts 12a or 13a, the reflected light becomes ghost light, and causes adverse effects on a captured image. Accordingly, it is preferable that the light reduction parts 12a and 13a are the absorption-type ND filter rather than the reflection-type ND filter.

The absorption-type ND filter includes a plurality of types, such as an ND filter in which an absorbing substance is mixed in the board itself, an ND filter in which the absorbing substance is applied to a surface of the board, an ND filter in which a light-reduction film having absorbability is formed on the surface of the board, and so on.

As one of the ND filters in which the light reduction film having the absorbability is formed on the surface of the board, an absorption-type multilayer film ND filter is known in which a thin film itself is formed as a multilayer film in order to prevent reflection of a surface of the thin film. In the absorption-type multilayer film ND filter, the light can be reduced, and the reflected light can also be reduced.

The absorption-type multilayer film ND filter is extremely useful for camera use because unnecessary reflected light is dramatically reduced by an effect of antireflection, so that the ghost light is reduced. Accordingly, it is preferable that the light reduction parts 12a and 13a are formed as the absorption-type multilayer film ND filter.

As a multilayer-film material in the absorption-type multilayer film ND filter, it is preferable to use an alternate-multilayer film made of metal and metallic oxide. For example, nickel, silicon, chrome, or tungsten is used for the metal, while silica dioxide is used for the metallic oxide. These materials are used, so that a light reduction film with a low reflection ratio can be easily achieved.

It is not necessary to limit the respective methods for manufacturing the first light reduction plate 12 and the second light reduction plate 13 to the above. For example, the first light reduction plate 12 and the second light reduction plate 13 may be manufactured by forming the through hole in the board which functions as the ND filter. In this case, an area where the through-hole is not formed corresponds to each of the light reduction parts 12a and 13a, while an area where the through-hole is formed corresponds to each of the light transmission parts 12b or 13b.

Next, a variety of operations of the light reduction device 10 configured as above is described with reference to FIG. 6.

Figure 6:
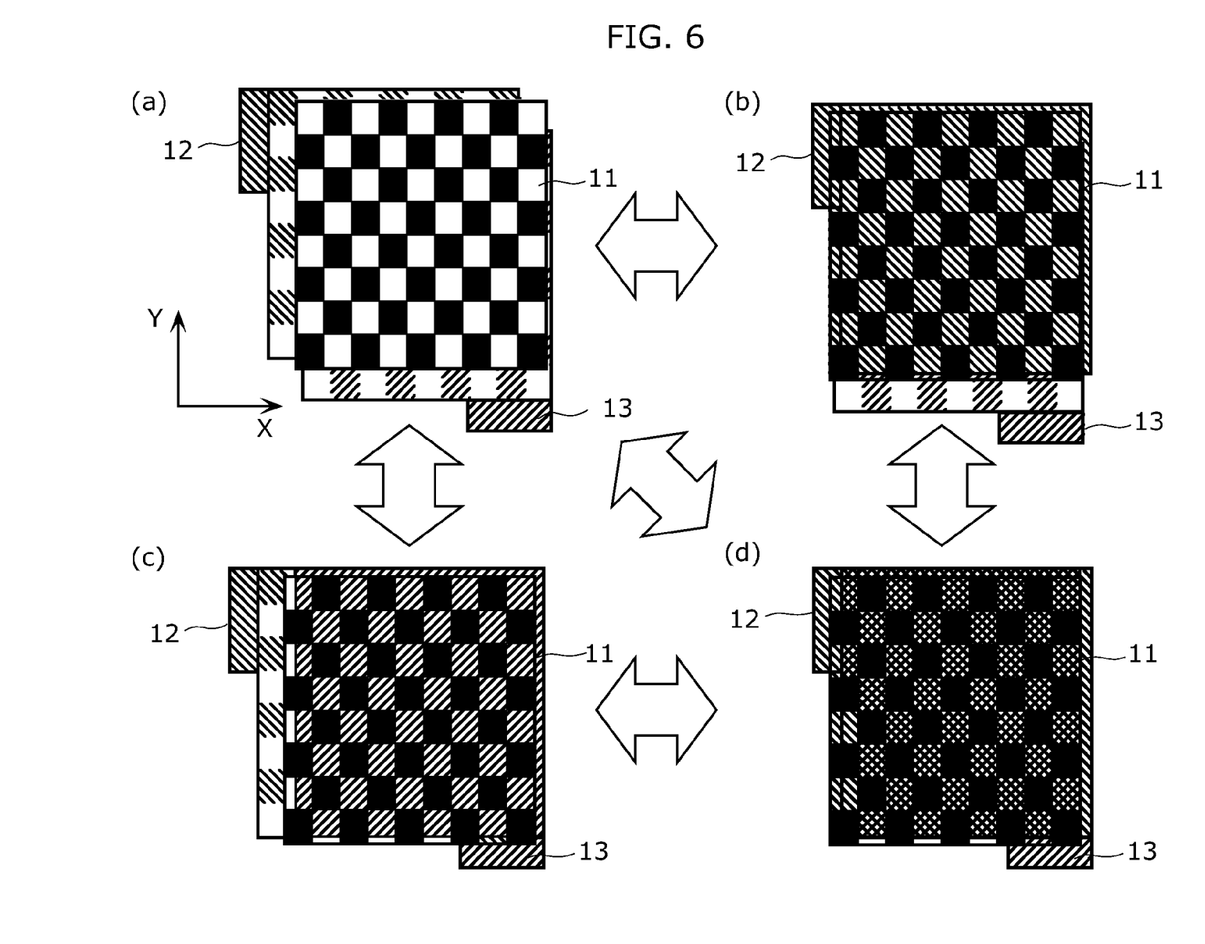
FIG. 6 is a diagram for illustrating an operation of the light reduction device according to the embodiment of the present invention.

FIG. 6 is a diagram for illustrating an operation of the light reduction device according to the embodiment of the present invention.

FIG. 6(a) shows a state that the light transmission parts 11b in the light shielding plate 11, the light transmission parts 12b in the first light reduction plate 12, and the light transmission parts 13b in the second light reduction plate 13 are arranged to overlap one another in the incident direction of the light. Specifically, FIG. 6(a) shows a state in which the light reduction parts 12a and 13a and the light shielding parts 11a overlap one another, when viewed from the incident direction of the light.

With this arrangement, the light reduction device 10 is capable of allowing the incident light to pass through, with an aperture ratio and transmission ratio same with those in the case when only the light shielding plate 11 is arranged.

The larger the aperture ratio is, the more preferable it is for enabling an amount of the light reaching the imaging device to increase. As the embodiment of the present invention, the light shielding parts 11a or other parts are arranged in the checkerboard design in the light shielding plate 11, the first light reduction plate 12, or the second light reduction plate 13, so that the light reduction device 10 can achieve the aperture ratio of 50%. Furthermore, in the light reduction device 10, either the light shielding parts 11a or the light transmission parts 11b can cover the light reduction parts 12a and 13a, when viewed from the incident direction of the light.

FIG. 6(b) shows a state that the moving unit 14 moves the first light reduction plate 12 in the X-direction by a pitch of the arrangement pattern from the state shown in FIG. 6(a). Here, the pitch means a distance, in a moving direction, between a center of one of the light reduction parts and a center of one of the light transmission parts. The one of the light reduction parts and the one of the light transmission parts are next to each other in the moving direction.

In FIG. 6(b), as a result of the movement of the first light reduction plate 12, the light transmission parts 11b in the light shielding plate 11 and the light reduction parts 12a in the first light reduction plate 12 overlap each other, when viewed from the incident direction of the light.

With this configuration, the light reduction device 10 can reduce the amount of the light reaching the imaging device 17 to 1/10 in comparison with that in the state shown in FIG. 6(a), when the light transmission-ratio of the light reduction parts 12a in the first light reduction plate 12 is 1/10.

To be specific, the light reduction device 10 can change a high transmission-ratio state where each of the light transmission parts 11b and a corresponding one of the light transmission parts 12b overlap to a low transmission-ratio state where each of the light transmission parts 11b and a corresponding one of the light reduction parts 12b overlap, without changing an aperture area.

Furthermore, the arrangement pattern for the light shielding parts 11a in the light shielding plate 11 and that for the light reduction parts 12a in the first light reduction plate 12a are identical. Accordingly, the light reduction device 10 allows the light shielding parts 11a and the light reduction parts 12a to overlap. In other words, in the light attenuation device 10, each of the light transmission parts 11b and a corresponding one of the light transmission parts 12b can overlap each other. Accordingly, a state where the light is not reduced by the light reduction parts 12a can be created, so that the high transmission-ratio can be achieved.

Furthermore, the light shielding parts 11a and the light transmission parts 11b are alternately arranged in the X-direction, while the light reduction parts 12a and the light transmission parts 12b are alternately arranged in the X-direction. Accordingly, in the light reduction device 10, the light shielding plate 11 is moved by a distance between the center of one of the light reduction parts 12a and the center of one of the light transmission parts 12b, in which the one of the light reduction parts 12a and the one of the light transmission parts 12b are next to each other in the X-direction, so that the states can be changed between the state where each of the light shielding parts 11a and a corresponding one of the light reduction parts 12a overlap and the state where each of the light transmission parts 11b and a corresponding one of the light reduction parts 12a overlap. Accordingly, in the light reduction device 10, the high transmission-ratio state and the low transmission-ratio state can be changed with a relatively small movement amount of the plates, and thus, miniaturization of the device can be achieved.

FIG. 6(c) shows a state where the moving unit 14 moves the second light reduction plate 13 in the Y-direction by the pitch from the state shown in FIG. 6(a).

In FIG. 6(c), as a result of the movement of the second light reduction plate 13, each of the light transmission parts 11b in the light shielding plate 11 and a corresponding one of the light reduction parts 13a in the second light reduction plate 13 overlap, when viewed from the incident direction of the light.

With this configuration, the light reduction device 10 can reduce the amount of the light reaching the imaging device 17 to 1/100 in comparison with that in the state shown in FIG. 6(a), when the light transmission-ratio of the light reduction parts 13a in the second light reduction plate 13 is 1/100.

The first light reduction plate and the second light reduction plate are moved in the respective directions which are orthogonal to each other. Accordingly, the moving unit can be easily placed, and the miniaturization of the device can be achieved.

FIG. 6(d) shows a state where the moving unit 14 causes the first light reduction plate 12 to move in the X-direction by the pitch, and the second light reduction plate 13 to move in the Y-direction by the pitch, from the state shown in FIG. 6(a).

In FIG. 6(d), as a result of the movement of the first light reduction plate 12 and the second light reduction plate 13, each of the light transmission parts 11b in the light shielding plate 11, a corresponding one of the light reduction parts 12a in the first light reduction plate 12, and a corresponding one of the light reduction parts 13a in the second light reduction plate 13 overlap one another, when viewed from the incident direction of the light.

With this configuration, the light reduction device 10 can reduce the amount of the light reaching the imaging device 17 to 1/1000 in comparison with that in the state shown in FIG. 6(a), when the light transmission-ratios of the light reduction parts 12a and 13a are respectively 1/10 and 1/100.

As described above, the light reduction device 10 is provided with the first light reduction plate 12 and the second light reduction plate 13 which include the respective light reduction parts having mutually different light transmission-ratios. Accordingly, the light reduction device 10 can achieve four light transmission-ratios respectively obtained in following cases: (1) the light is not reduced by the first light reduction plate 12 and the second light reduction plate 13; (2) the light is reduced by the first light reduction plate 12; (3) the light is reduced by the second light reduction plate 13; and (4) the light is reduced by both of the first light reduction plate 12 and the second light reduction plate 13. Therefore, the light reduction device 10 can effectively change the light transmission-ratios.

Although the state shown in FIG. 6(a) is changed to each state shown in FIG. 6(b), 6(c), or 6(d) in the above description, the state can be changed in the reverse direction by moving the light reduction plate in the reverse direction. In addition, the states shown in respective FIGS. 6(b), 6(c), and 6(d) can be changed to one another.

As described above, in the light reduction device 10 according to the embodiment of the present invention, the light shielding parts 11a and the light reduction parts 12a are discretely formed in the light shielding plate 11 and the first light reduction plate 12, respectively. Accordingly, in the light reduction device 10, the first light reduction plate 12 is moved in the X-direction which intersects with the incident direction of the light, to thereby change an overlap pattern between the light shielding parts 11a and the light reduction parts 12a. As a result, the light transmission-ratio can be changed. In other words, according to the light reduction device 10, the first light reduction plate 12 is not required to significantly move for changing the light transmission-ratio, so that the miniaturization of the device can be achieved. Furthermore, according to the light reduction device 10, an area of each one of the light transmission parts 11b formed in the light shielding plate 11, i.e., an aperture area, is not changed, when the light transmission-ratio is changed. Therefore, variation in a blur degree can be suppressed.

[Modification]

Figure 7:
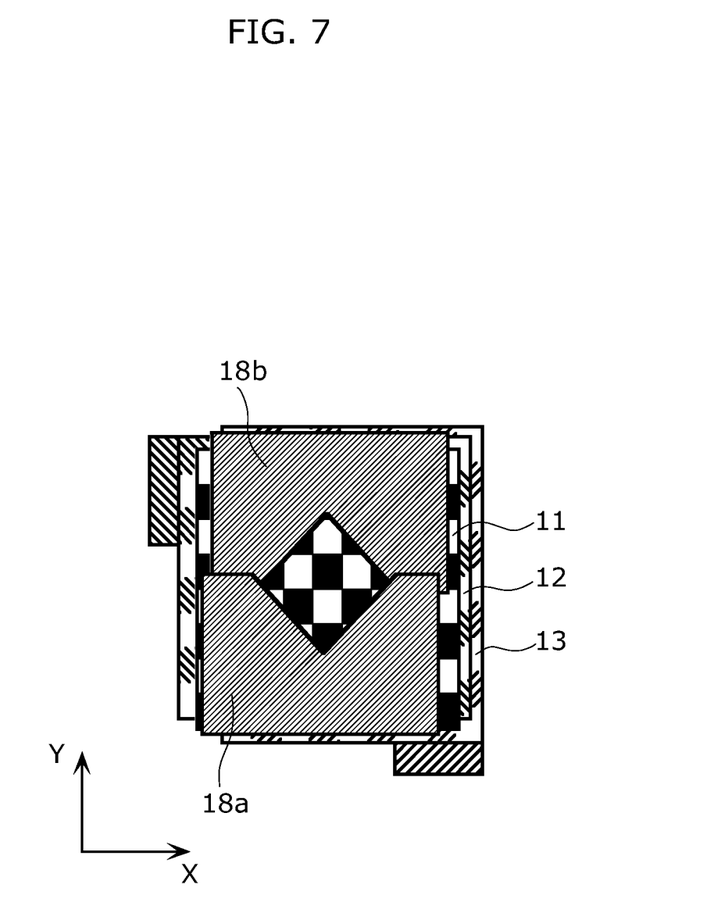
FIG. 7 is a diagram which shows a configuration of a light reduction device according to a modification of the present invention.

Next, a modification for an embodiment of the present invention is described with reference to a drawing.

FIG. 7 is a diagram which shows a configuration of a light reduction device according to the modification of the embodiment of the present invention.

As shown in FIG. 7, the light reduction device according to the modification further includes a lower diaphragm blade 18a and an upper diaphragm blade 18b in addition to structural components provided in the light reduction device according to the aforementioned embodiment.

The moving unit 14 moves the lower diaphragm blade 18a and the upper diaphragm blade 18b, to thereby change an aperture area. As a result, an amount of the light reaching the imaging device 17 can be adjusted.

As described above, the light reduction device 10 according to the modification can reduce light using the first light reduction plate 12 or the second light reduction plate 13 in the aforementioned embodiment, and also can reduce the light using a conventional diaphragm. Therefore, the light reduction device 10 can control the light reduction using the first light reduction plate 12 or the second light reduction plate 13, while controlling the blur degree of a captured image using the lower diaphragm blade 18a and the upper diaphragm blade 18b. Accordingly, favorable shooting can be enabled in various shooting scenes.

It should be noted that the diaphragm which employs the lower diaphragm blade 18a and the upper diaphragm blade 18b is merely an example of conventional diaphragms, and the light reduction device 10 may include a diaphragm different from the above.

Although the light reduction device according to an embodiment of the present invention and an imaging apparatus provided therewith are described according to the embodiment and modification thereof, the present invention is not limited to the embodiment and the modification. All possible variations which include modifications added by a person skilled in the art in his/her conceivable range are involved in the present invention as long as the variations do not depart from principles of the present invention For example, though in the aforementioned embodiment, the light shielding parts 11a and the light transmission parts 11b are arranged in a checkerboard design in the light shielding plate 11, these parts are not necessarily arranged in the checkerboard design. Therefore, each of the light shielding parts 11a and each of the light transmission parts 11b are not necessarily formed in a square. Furthermore, the light shielding parts 11a and the light transmission part 11b are not necessarily arranged alternately in the light shielding plate 11. In addition, it is not necessarily required that an arrangement pattern of the light shielding parts 11a in the light shielding plate 11 and an arrangement pattern of the light reduction parts 12a in the first light reduction plate 12 are identical to each other.

Even in such a case, in the light reduction device 10, an area of the light transmission part 11b, formed in the light shielding plate 11, i.e., the aperture area, is not changed upon controlling an amount of the light reaching the imaging device 17, to thereby suppress variation in the blur degree. Furthermore, in order to change a light transmission-ratio, it is only necessary for the light reduction device 10 to change an overlap pattern between the light shielding parts 11a and the light reduction parts 12a. Accordingly, the first light reduction plate 12 is not required to significantly move, to thereby achieve miniaturization of the device.

Furthermore, though the light reduction device 10 includes two light reduction plates (first light reduction plate 12 and second light reduction plate 13) in the above embodiment, the number of the light reduction plate to be included is not necessarily two. The light reduction device according to an embodiment of the present invention may include at least one light reduction plate. Even if the number of the used light reduction plate is one, the light reduction device 10 can control the variation in the blur degree upon adjusting the amount of the light reaching the imaging device 17, and can achieve the miniaturization of the device.

Furthermore, the light reduction device 10 may include three or more light reduction plates. With this configuration, the light reduction device 10 can effectively achieve more variety of light transmission ratios.

In the above embodiments, according to the light reduction device 10, the first light reduction plate 12 is moved in the X-direction, and the second light reduction plate 13 is moved in the Y-direction. However, it is not necessarily required for the two light reduction plates to move in the respective directions orthogonal to each other. For example, in the light reduction device 10, both of the first light reduction plate 12 and the second light reduction plate 13 may be moved in the X-direction. In other words, the first direction and the second direction may be in the same direction. In this case, a moving unit 14 for moving the first light reduction plate 12 and a moving unit 14 for moving the second light reduction plate 13 may be arranged in positions opposite to each other with respect to an optical axis. With this configuration, the miniaturization of the device can be achieved.

Although in the above embodiment, the first light reduction plate 12 and the second light reduction plate 13 are moved in the light reduction device 10, the light shielding plate 11 may be moved. Specifically, it is beneficial for the light reduction device 10 to change a relative position-relationship between the light shielding plate 11 and the first light reduction plate 12, or between the light shielding plate 11 and the second light reduction plate 13, when viewed from the incident direction of the light.

Although in the above embodiment, the moving unit 14 moves the first light reduction plate 12 or the second light reduction plate 13 by a pitch, these plates are not necessarily moved by the pitch. For example, the moving unit 14 may move the first light reduction plate 12 or the second light reduction plate 13 by a distance which is twice or three times of the pitch.

Although in the above embodiment, each of the light shielding plate 11, the first light reduction plate 12, and the second light reduction plate 13 has a rectangular shape, these plates are not necessarily required to be in the rectangular shape. For example, the light shielding plate 11, the first light reduction plate 12 and the second light reduction plate 13 may be formed in a circle or a polygon shape, such as a hexagonal shape.

INDUSTRIAL APPLICABILITY

The light reduction device according to the present invention is useful for a digital still camera, digital video camera, and so on.

REFERENCE SIGNS LIST

10 Light reduction device
11 Light shielding plate
11a Light shielding part
11b, 12b, and 13b Light transmission part
12 First light reduction plate
12a, 13a Light reduction part
12c, 13c Projection unit
13 Second light reduction plate
14 Moving unit
15 Optical lens system
16 Cover glass
17 Imaging device
18a Lower diaphragm blade
18b Upper diaphragm blade
100 Imaging apparatus

The invention claimed is:

1. A light reduction device for adjusting an amount of light reaching an imaging device, the light reduction device comprising:
 a light shielding plate in which a plurality of light shielding parts are discretely formed for blocking the light, and a first light transmission part is formed for transmitting the light;
 a first light reduction plate in which a plurality of first light reduction parts are discretely formed for reducing the amount of the light passing through, and a second light transmission part is formed for transmitting the light, the first light reduction plate overlapping the light shielding plate at least in part, when viewed from an incident direction of the light; and
 a moving unit configured to move at least one of the light shielding plate and the first light reduction plate in a first direction which intersects with the incident direction of the light, so as to change an overlap pattern between the light shielding parts and the first light reduction parts, when viewed from the incident direction of the light.

2. The light reduction device according to claim 1,
 wherein an arrangement pattern of the light shielding parts in the light shielding plate and an arrangement pattern of the first light reduction parts in the first light reduction plate are identical, and
 each of the light shielding parts and each of the first light reduction parts are identical in shape and size.

3. The light reduction device according to claim 2,
 wherein the light shielding parts and the first light transmission part are alternately arranged in the first direction in the light shielding plate, and
 the first light reduction parts and the second light transmission part are alternately arranged in the first direction in the first light reduction plate.

4. The light reduction device according to claim 3,
 wherein a plurality of first light transmission parts including the first light transmission part are formed in the light shielding plate;
 a plurality of second light transmission parts including the second light transmission part are formed in the first light reduction plate;
 the light shielding parts and the first light transmission parts are arranged in a checkerboard design in the light shielding plate; and
 the first light reduction parts and the second light transmission parts are arranged in the checkerboard design in the first light reduction plate.

5. The light reduction device according to claim 3,
 wherein the moving unit is configured to move at least one of the light shielding plate and the first light reduction plate in the first direction so that the light shielding plate and the first light reduction plate relatively move by a distance, in the first direction, between a center of one of the first light reduction parts and a center of the second light transmission part which are next to each other in the first direction.

6. The light reduction device according to claim 1,
 wherein the moving unit is configured to move at least one of the light shielding plate and the first light reduction plate so that a state in which each of the first light reduction parts and a corresponding one of the light shielding parts overlap is changed to a state in which each of the first light reduction parts and the first light transmission part overlap, when viewed from the incident direction of the light.

7. The light reduction device according to claim 1, further comprising
 a second light reduction plate in which a plurality of second light reduction parts are discretely formed for reducing the amount of the light passing through, and a third light transmission part is formed for transmitting the light,
 wherein the light shielding plate and the second light reduction plate overlap each other at least in part, when viewed from the incident direction of the light, and
 the moving unit is configured to move the first light reduction plate in the first direction, and the second light reduction plate in a second direction which intersects with the incident direction of the light.

8. The light reduction device according to claim 7,
 wherein the first direction and the second direction are orthogonal to each other.

9. The light reduction device according to claim 7,
 wherein a transmission ratio of the first light reduction parts and a transmission ratio of the second light reduction parts are different from each other.

10. An imaging apparatus comprising the light reduction device according to claim 1.

* * * * *